United States Patent [19]

Temple

[11] Patent Number: 5,707,523

[45] Date of Patent: Jan. 13, 1998

[54] DYNAMIC VERTICAL SOLIDS SEPARATOR

[76] Inventor: Stephen R. Temple, 207 Pennsylvania Ave., Santa Cruz, Calif. 95062

[21] Appl. No.: 431,020

[22] Filed: Apr. 28, 1995

[51] Int. Cl.⁶ .................................................. B01D 21/00
[52] U.S. Cl. .................................... 210/521; 210/532.1
[58] Field of Search ............................. 210/786, 521, 210/513, 532.1

[56] References Cited

U.S. PATENT DOCUMENTS

| | | | |
|---|---|---|---|
| 2,057,887 | 10/1936 | Elliott et al. | 210/786 |
| 3,798,159 | 3/1974 | Kisbocskoi et al. | 210/786 |
| 4,053,408 | 10/1977 | O'Cheskey | 210/786 |
| 4,060,484 | 11/1977 | Austin et al. | 210/786 |
| 4,115,266 | 9/1978 | Ohshima | 210/786 |
| 4,246,102 | 1/1981 | Hjelmner et al. | 210/786 |
| 4,297,640 | 10/1981 | Moore et al. | 324/458 |
| 4,612,115 | 9/1986 | Titoff | 210/786 |
| 4,820,990 | 4/1989 | Moore et al. | 324/445 |
| 5,160,439 | 11/1992 | Dobrez et al. | 210/709 |
| 5,246,590 | 9/1993 | Dobrez et al. | 210/705 |

OTHER PUBLICATIONS

Dentel, Steven K. and Kingery, Dristine M., An Evaluation of Streaming Current Detectors, 1988, published by the American Water Works Association, Research Report, pp. 150–153.

S.K. Dentel and K.M. Kingery, "Theoretical Principles of Streaming Current Detection"., 1989, *Wat. Sci. Tech.*, vol. 21., Brighton, pp. 443–453.

AWWA Research Foundation, "Research Report, Subject Area: Water Treatment and Operations", Denver, CO, pp. 150–153.

"The Electrokinetic Connection", pp. 1–13.

Kerrigan–DuPree, Inc., product brochure on Streaming Current Detector; New Orleans, Louisiana.

Kerrigan–DuPree, Inc., product brochure on Streaming Current Detector Model SCD–100; 1986, Metairie, LA.

*Primary Examiner*—Robert J. Popovics
*Attorney, Agent, or Firm*—Hickman Beyer & Weaver, LLP

[57] ABSTRACT

A dynamic vertical solids separator acts as a dynamic filter to produce a clarified supernate sample for use in measuring the net electrokinetic charge demand of finely divided particles suspended in the slurry. The dynamic vertical solids separator first removes silt by simple solids separation, and then promotes rapid agglomeration of particles by first directing the slurry across serrated floc plates and then discharging the slurry upward through a venturi. Above the venturi a dynamic sample pool forms, within which the clarifying action occurs. The clarified supernate forms above the sample pool with a visible boundary separating the two. The clarified supernate can be fed to a streaming current detector for measuring the net electrokinetic charge demand of finely divided particles suspended in the slurry, or the position of the boundary can be measured as an indication of the concentration of finely divided particles suspended in the slurry. The measure of the net electrokinetic charge demand of finely divided particles suspended in the slurry can then be used in an automatic control system to control the turbidity of the slurry.

9 Claims, 8 Drawing Sheets

DYNAMIC VERTICAL SOLIDS SEPARATOR

BACKGROUND OF THE INVENTION

The present invention relates generally to detecting the net electrokinetic charge demand of finely divided particles suspended in a slurry.

A major component of any slurry treatment process is the removal of turbid particles from the slurry. As used herein, a slurry refers to any turbid solution, including an aqueous solution, some examples being raw sewage and/or waste water from any number of industrial processes including dish washing, laundries, food processing, meat packaging, corrugated box and container production, paper production, etc. Additional appropriate examples of slurries include untreated water from various sources including but not limited to rivers, streams, brooks and reservoirs. Turbid particles are not limited to but can range in size from about 0.01 to 100 microns. The larger, denser particles can be removed with relative ease, either through settling, filtration, flotation, centrifugation, or one or more of the foregoing physical separatory processes in combination. Removing the finely divided particles, which include colloidal and sub-colloidal particles, presents a more serious challenge. Generally, settling times for finely divided particles are intolerably slow, and filtration is impractical. Removal of these particles is often done by adding treatment chemicals which interact with the finely divided particles to produce larger, aggregate particles. These agglomerated particles can then be removed through one of the aforementioned separatory processes.

There are two competing forces which strongly influence the behavior of the charged particles suspended in a slurry. These are electrokinetic charge and van der Waals forces. Under normal conditions, the strongest influence on the behavior of charged particles is their electrokinetic charge. Each finely divided particle carries an electrokinetic charge, which in nature is typically, but not necessarily, a negative charge. As is well known, like charges repel each other, which in this instance prevents effective agglomeration of the finely divided particles. Agglomeration, as used herein, is the process of particles bonding together through a variety of means to form larger particles. Thus agglomerated particles are larger particles formed through the agglomeration of finely divided particles suspended in a slurry. The other competing force, van der Waals attraction force, is the result of attraction forces between individual molecules in each colloidal particle. The resulting combination of the electrokinetic charge and the van der Waals forces is a net interaction energy. The net interaction energy between two particles is also a function of the distance between the two particles, and if plotted versus distance, it can be seen that there is an energy barrier which must be overcome for the charged particles to agglomerate. As a result, like charged particles tend to remain discrete, dispersed, and in suspension.

A common method for promoting agglomeration is to reduce the magnitude of the electrokinetic charge of the finely divided particles. Towards this end, a treatment chemical called a coagulant is introduced into the slurry. By way of example, chemicals such as aluminum chloride, alum, ferric chloride, and various polymeric materials such as water soluble cationic and anionic organic polyelectrolytes are introduced into the slurry. The coagulant typically has a charge opposite of the electrokinetic charge of the freely divided particles suspended in the slurry. Thus the coagulant and the finely divided particles attract each other, resulting in the reduction or neutralization of the electrokinetic charge of the finely divided particles. Through Browing diffusion and effective mixing, the particles are free to collide and aggregate, first forming small groups, then larger aggregates, and finally visible particles which can settle rapidly and filter easily. To produce even faster settling times, another treatment chemical referred to as a flocculant can be added to the slurry. The aggregate particles become trapped in the flocculant, thereby creating larger, denser "floc" particles. These floc particles result in even faster settling and easier filtering.

Probably the crudest method utilizing coagulants and flocculants to treat a slurry involves simply adding an overabundance of treatment chemicals into the slurry. This solution has the undesirable side effect of wasting expensive chemicals during periods of overdosage, while being ineffective during periods of underdosage, thereby producing inconsistent water quality.

The current "state of the art" method utilizes an instrument called the streaming current detector (SCD) for automatically controlling the treatment chemical feed rates through feedback. The SCD operates on a sample influent of the waste water to measure the streaming current of finely divided charged particles suspended in the waste water. The art of streaming current detection is fairly complex and there are a number of theoretical aspects which are currently not fully understood. An extensive discourse on SCD can be found in the following reference: Dentel, Steven K. and Kingery, Kristine M. *An Evaluation of Streaming Current Detectors*, Denver, Colo., American Water Works Association, 1988. This report is incorporated herein by reference. Fortunately, for understanding the use of the SCD in waste water treatment, and more specifically the present invention, it is sufficient to know that streaming current is proportional to the electrokinetic charge of finely divided particles suspended in the waste water, and thus is a direct indication of the system requirement for treatment chemical. The SCD typically works in conjunction with a standard, off the shelf commercial controller, such as a programmable logic controller (PLC). A proportional, integral, and derivative (PID) feedback controller may be implemented on the PLC to control the treatment chemical feed rates. The SCD is used as the feedback sensor within the control loop.

Figure 1:
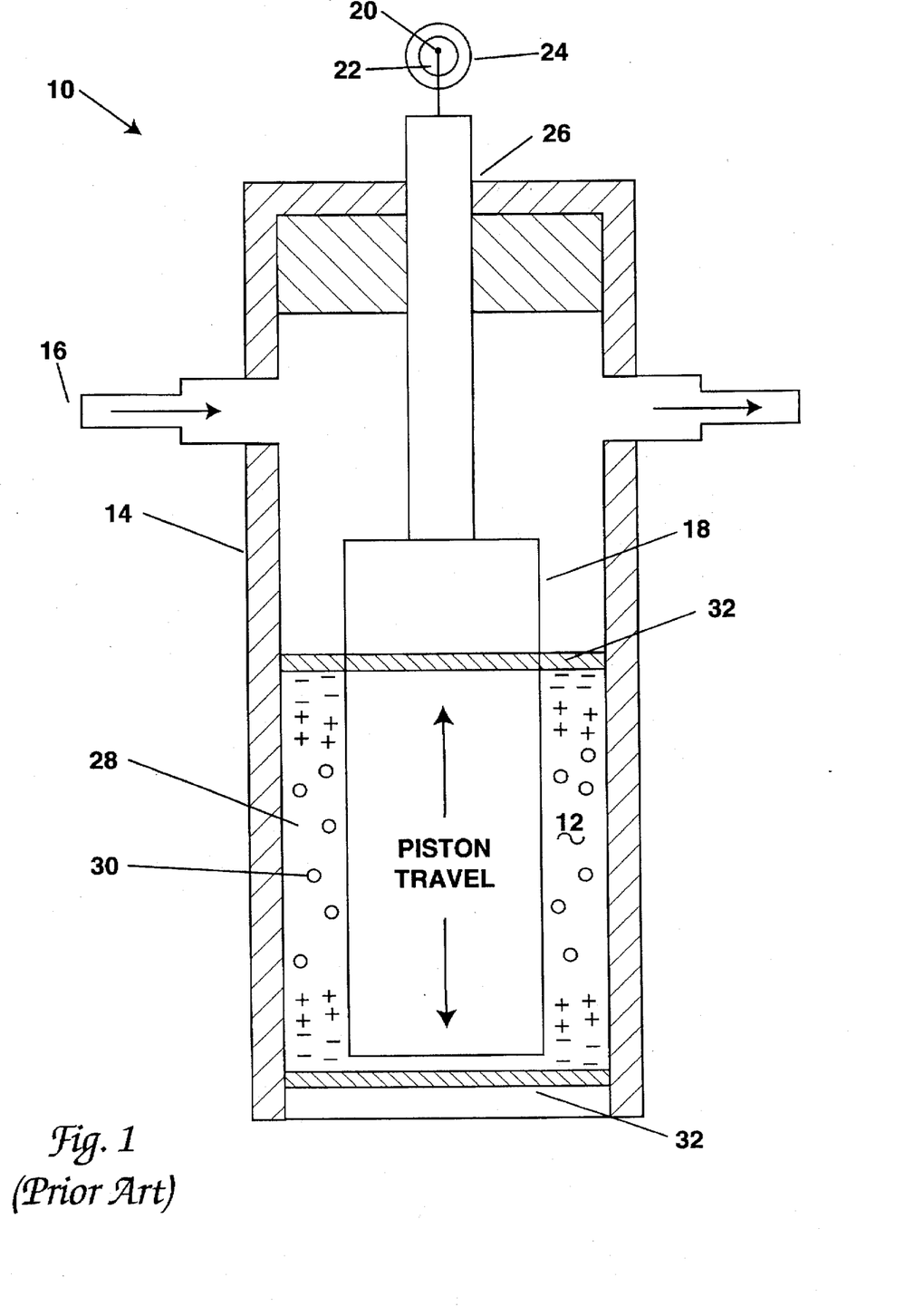
FIG. 1 is diagrammatic broken away side view of a streaming current detector sensor of the prior art.

FIG. 1a illustrates an SCD sensor 10 of the prior art. A treated water sample 12 flows into the piston chamber 14 through the sample input port 16. The piston 18 is attached to an eccentric point 20 of a wheel 22 which is driven by a constant speed motor 24. When the motor 24 is operating, the piston guide 26 causes the piston 18 to move vertically with a sinusoidal velocity inside the piston chamber 14. The space between the piston 18 and the chamber 14 is called the annulus 28. It is here, within the annulus 28, that the heart of the SCD sensor 10 is located. The annulus 28 has the shape of a thin, cylindrical shell, which contains the treated water sample 12 and the momentarily immobilized particles 30. Clearance between the piston 18 and the chamber 14 is several thousandths of an inch. Cycling the piston 18 creates an electrical current through the sensing electrodes 32. This current is called the streaming current, and as disclosed previously, this current is proportional to the electrokinetic charge of the suspended finely divided particles.

The use of the SCD in the waste water treatment control system has produced mixed results. It appears that when working properly, the continuous, instantaneous feedback and response of the SCD control system produce the expected results: significant reduction in the quantities of treatment chemical used, especially during unstable raw water conditions, and an improved level of consistency in the water quality. However, due to the operating environment and its effects on the SCD, there are still some hurdles remaining to the completely successful operation of the SCD control system.

One hurdle to successful operation occurs when a coating begins forming on the components of the SCD sensor. This coating is formed from naturally occurring chemicals and products of the treatment chemicals. The coating degrades performance of the SCD, typically manifesting as a decrease in the sensitivity of the SCD, and can have an adverse effect on the control system. Regular, preventative maintenance, such as cleaning the sensor and flushing the sample line, has been found to be beneficial. However, this solution results in a decrease in effectiveness of the SCD control system, as maintenance costs money and the SCD cannot operate during maintenance periods. Furthermore, simply performing periodic maintenance still results in potentially poor SCD performance during the inbetween periods.

Another hurdle to successful operation is the large amount of suspended solids often present in the slurry sample. Suspended solids in the SCD can cause abrasion of the sensor and clogging of the plumbing. Taking into account the small volume of the SCD sensor annulus and the available clearance between the chamber and the piston, it is obvious that any large particles could cause severe damage to the SCD sensor. This damage could result in degradation of the sensor output signal.

Figure 2A:
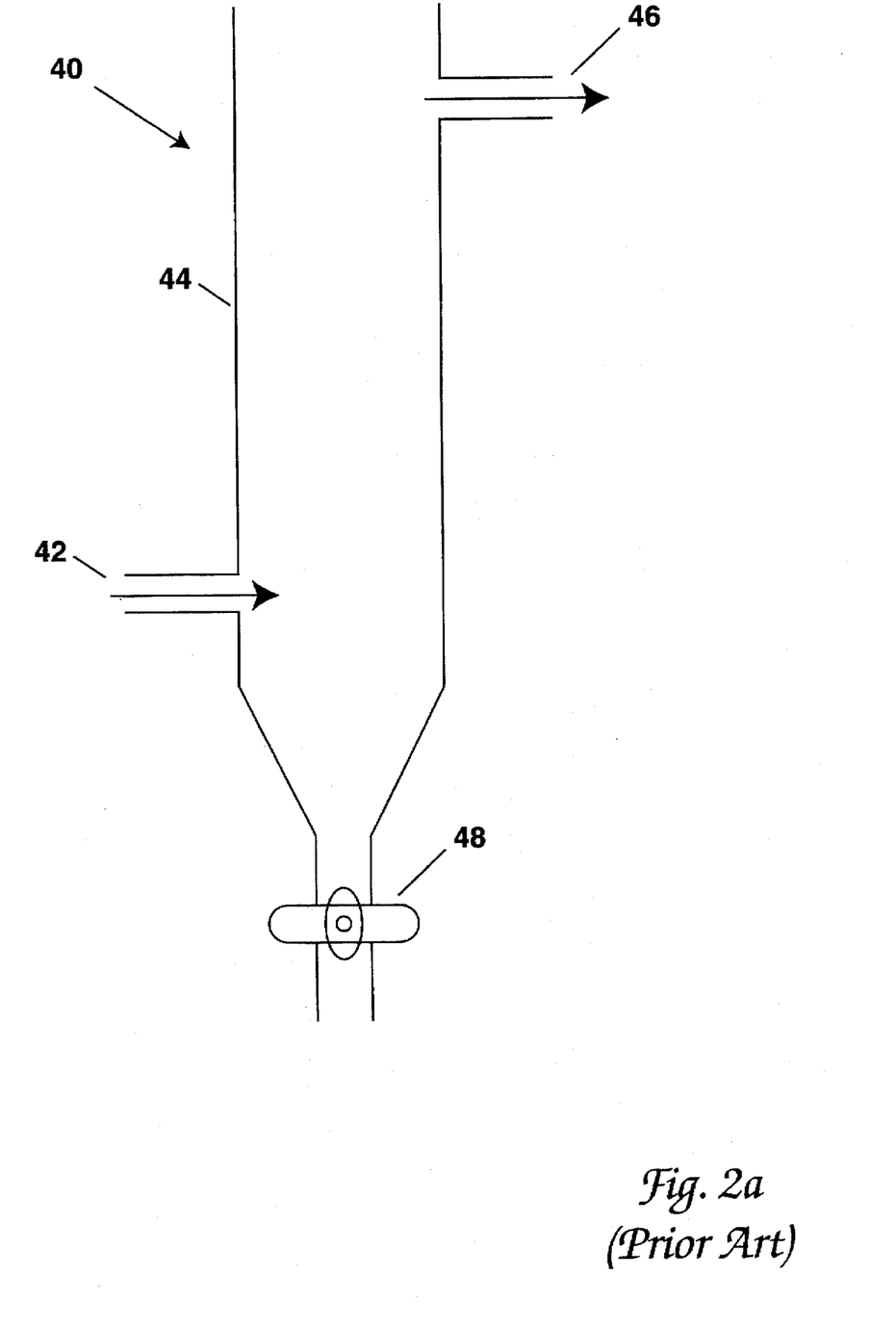
FIG. 2a is a diagrammatic illustration of an upflow solids separator of the prior art.

One attempted solution to silt utilizes an upflow solids separator which is illustrated in FIG. 2a. An upflow solids separator 40 includes a sample input port 42, a settling chamber 44, an output port 46 located above the input port 42, and a manual valve 48 located at the lowest point of the settling chamber 44. This device relies on the upward flow velocity of the sample being less than the settling velocity of the silt, resulting in the silt settling to the bottom. After a period of operation, the buildup at the bottom can be removed by opening the manual valve. This device, while operable, is not completely effective. Enough silt passes through to continue to score the SCD sensor and eventually clog the sample lines.

Figure 2B:
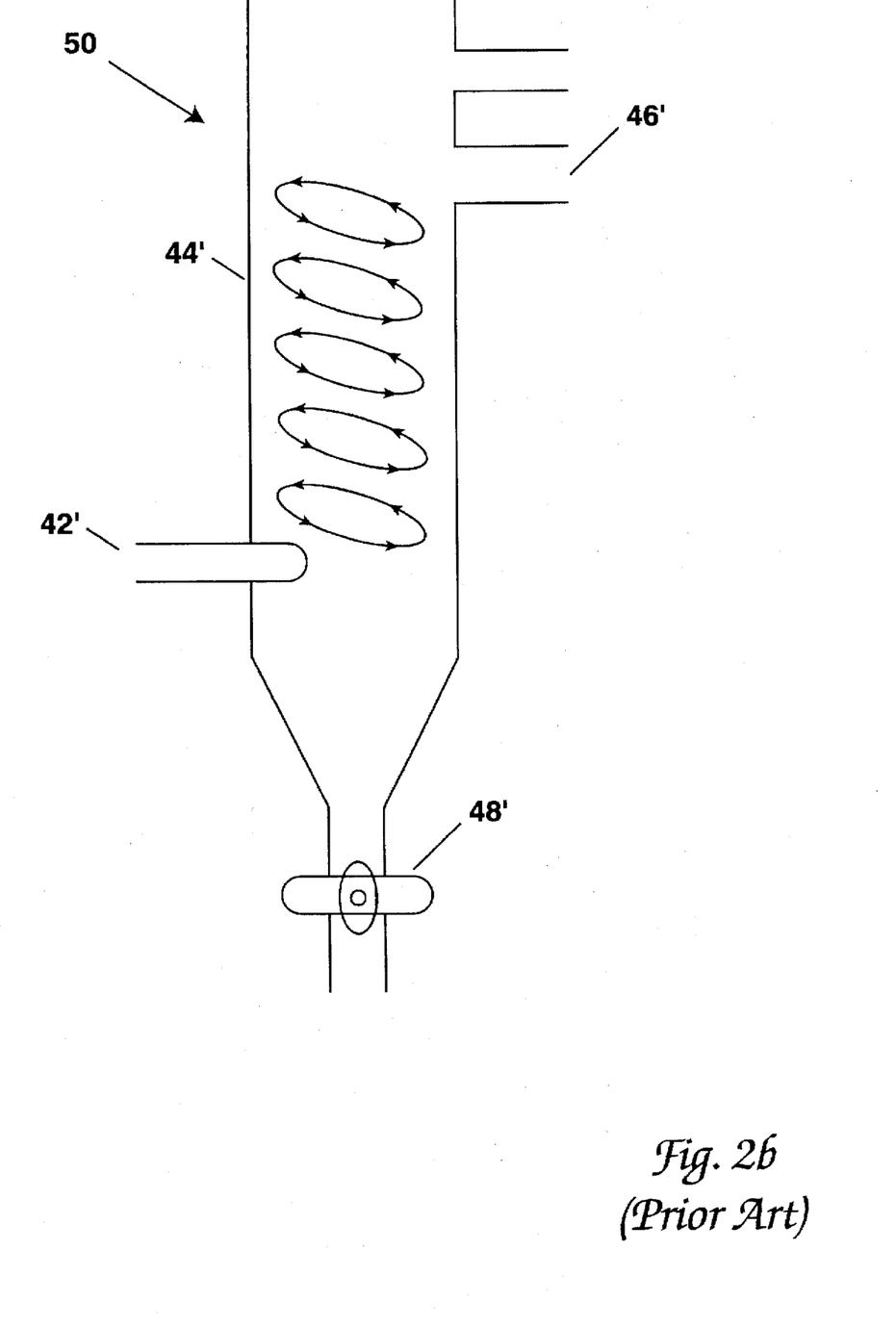
FIG. 2b is a diagrammatic illustration of a cyclone separator of the prior art.

An improvement on the simple upflow solids separator 40 is illustrated in FIG. 2b. The sample input port 42' of the cyclone separator 50 is positioned in such a manner that the sample influent enters horizontally and then swirls upward in the settling chamber 44'. Here the output port 46' and the manual valve 48' are used in an identical manner as discussed with regards to FIG. 2a. This device, while an improvement over the simple upflow solids separator 40, is not completely effective. Enough silt passes through to continue to score the SCD sensor and eventually clog the sample lines.

SUMMARY OF THE INVENTION

The present invention relates generally to a net particle charge detector system and method for detecting the net electrokinetic charge demand of finely divided particles suspended in a turbid slurry. More specifically, the particle charge detector utilizes a dynamic vertical solids separator to produce a clarified supernate from a slurry sample. The clarified supernate has a concentration of finely divided particles representative of the concentration in the slurry.

In accordance with one aspect of the invention, a dynamic vertical solids separator is provided that has a generally vertically oriented clarifying conduit disposed within a housing chamber. The clarifying conduit has a slurry sample inlet and a slurry sample outlet that discharges the slurry in a generally upward direction into a dynamic sample pool formed within the housing chamber. In one embodiment, a low pressure region is formed in the vicinity of the slurry sample outlet. By way of example, the low pressure region may be formed through the use of a venturi. A return conduit is formed external to the clarifying conduit to drain a sludge material from the sample pool. A supernate discharge port is provided to discharge supernate fluid from the housing chamber. The supernate discharge port is positioned above the clarifying conduit's slurry sample outlet and the sample pool. In use, when a slurry sample is input into the clarifying conduit, the sample pool is formed over the clarifying conduit's slurry sample outlet and the slurry sample is clarified at the sample pool into a supernate and a sludge with the supernate passing substantially through the supernate discharge port and the sludge passing substantially through the sludge discharge port.

In one preferred embodiment, the dynamic vertical solids separator is used as a prefilter in a particle charge detector system which includes a streaming current detector that detects the net electrokinetic charge demand of finely divided particles suspended in the supernate discharged from the supernate discharge port. In this embodiment, it may be desirable to further provide a skimming port positioned above the supernate discharge port for skimming materials having a low specific gravity from the supernate.

In another embodiment, the clarifying conduit further includes a silt drain positioned below the slurry sample inlet for discharging especially heavy particles from the slurry sample. The silt drain is sized substantially smaller than the slurry sample outlet such that the vast majority of the slurry sample passes through the slurry sample outlet rather than the silt drain. In a preferred arrangement, the silt drain opens into the housing chamber below the return conduit but above the sludge discharge port. In some embodiments, the clarifying conduit includes a multiplicity of floc plates operable for mixing and increasing particle collision in the slurry sample hence promoting agglomeration of finely divided particles suspended in the slurry sample.

The described dynamic vertical solids separator may be used as a dynamic filter for a streaming current detector of a net particle charge detector system. Alternatively, the dynamic vertical solids separator may be used as the net particle charge detector itself. These detectors are well suited for use in slurry purification systems such as waste water treatment plants. Methods for clarifying slurries, detecting finely divided charged particle levels and controlling slurry purification systems are also described. dr

DETAILED DESCRIPTION OF THE PREFERRED EMBODIMENTS

Figure 3:
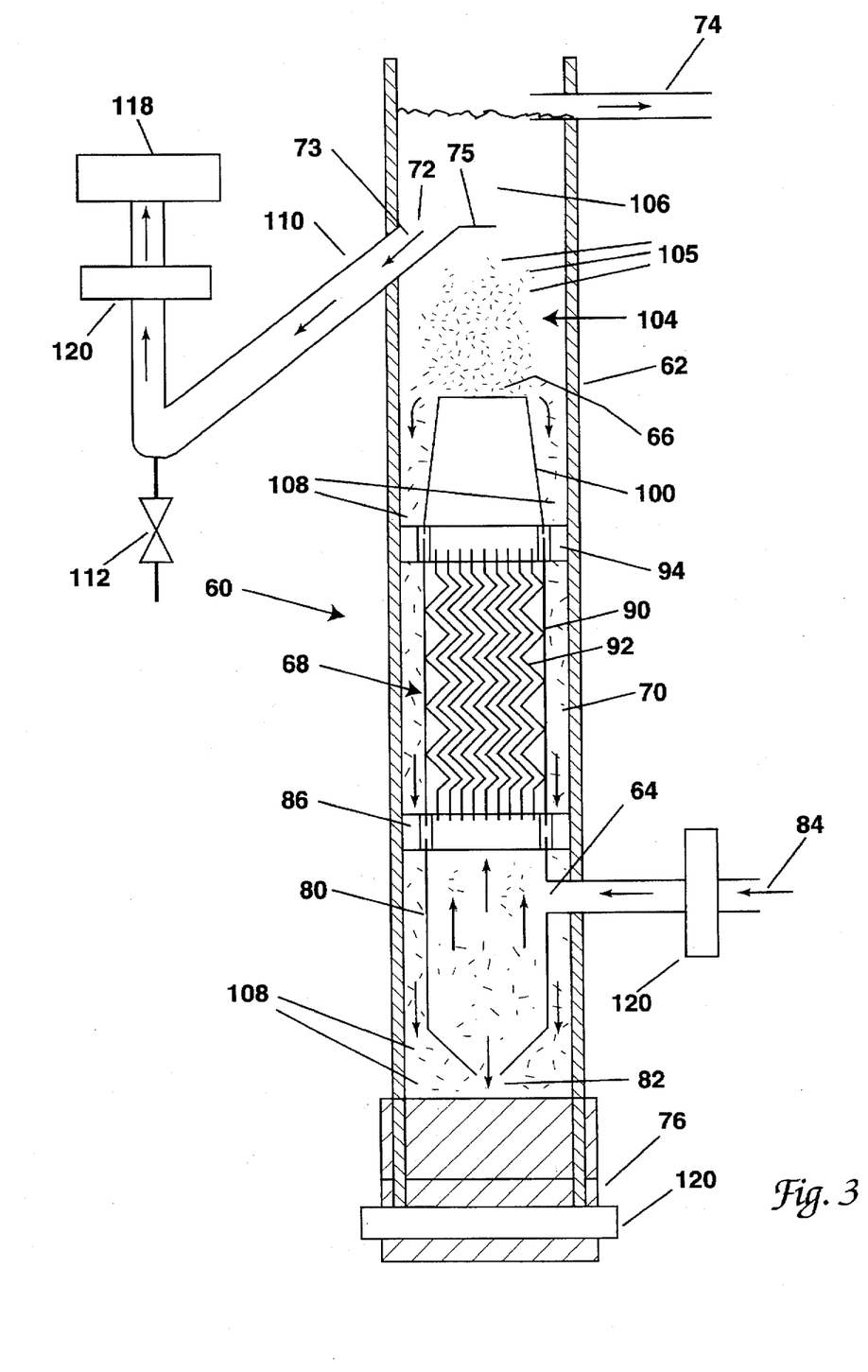
FIG. 3 is a diagrammatic illustration of a dynamic vertical solids separator in accordance with one embodiment of the invention that is adapted to feed supernate to a streaming current detector.

Referring initially to FIG. 3, a dynamic vertical solids separator 60, in accordance with one embodiment of the present invention includes a housing chamber 62, a slurry sample inlet 64, a slurry sample outlet 66, a clarifying conduit 68, a return conduit 70, a supernate discharge port 72, a skimming port 74, a lip 75, and a sludge discharge port 76. A slurry sample 84 flows from a source of slurry and is discharged into the clarifying conduit 68. The flow of the slurry sample is then generally upward through the clarifying conduit 68 until it is discharged out of the clarifying conduit 68 through the slurry sample outlet 66. The clarifying conduit 68 is built such that the region immediately above the sample outlet is a low pressure region. Due to the constant flow of slurry sample 84 into the low pressure region, a clarifying slurry sample pool 104 forms above the sample outlet. Sludge 108 drains out of the sample pool 104 and is relieved through the return conduit 70, while a clad fled supernate forms above the sample pool 104 and is removed by the supernate discharge port 72. The sludge 108 includes agglomerated solids and may include fluid and other particles from the slurry sample 84. In this embodiment, the sludge falls out of the slurry sample due to gravitational forces superceding the rise velocity of the slurry sample 84. However, in other embodiments the sludge 108 could be drawn out by other mechanisms. The skimming port 74 serves to remove any particles which have a very low specific gravity, particles which essentially "float" to the top and are not captured by the supernate discharge port 72.

The embodiment illustrated in FIG. 3 has the clarifying conduit 68 aligned generally vertically within the housing chamber 62. The clarifying conduit 68 of FIG. 3 includes an entrance chamber 80, a floc plate assembly 90, and a venturi 100. The floc plate assembly 90 includes a bottom cap 86 and a top cap 94 which cooperate to support a multiplicity of floc plates 92. The slurry sample 84 is passed into the clarifying conduit 68 through the slurry sample inlet 64. The slurry sample 84 flow is then directed generally upward through the floc plate assembly 90. It should be appreciated that the flow of the slurry through the clarifying conduit is primarily controlled by the shape and size of the clarifying conduit 68. The flow rate is preferably chosen such that the upward flow velocity of the slurry sample 84 is less than the settling velocity of any silt and agglomerated solids in the slurry and as a result, the silt and agglomerated solids will settle out and fall to the bottom of the chamber 90.

The chamber 80 has a silt drain 82 located at its lowest point. The silt drain 82 allows the desired solids, primarily the denser, heavier solids, to efficiently drain out the chamber 80 directly into the housing chamber 62, thereby avoiding potential depositional clogging. In alternative embodiments, the silt drain 82 includes tubing or other suitable arrangements for transferring the fluid outside of the housing chamber. In yet another embodiment, a valve may be provided to block the drain. The silt may then be discharged in batch mode by merely either manually or automatically opening and closing the valve. As shown in FIG. 3, the silt drain is narrower than the sample outlet at the venturi 100, thus promoting upward flow.

In the embodiment shown, the slurry sample enters the clarifying conduit in a generally horizontal direction although other entrance directions are contemplated. As the slurry sample 84 enters the chamber, it's velocity is redirected, with the majority of the slurry flow traveling upward, while a smaller volume having a significantly higher specific gravity is directed downward. Of course different configurations will achieve equivalent results, while other configurations may operate better under different conditions. For example, in an equivalent embodiment the slurry sample inlet 64 is directed generally downwards while the chamber 80 has a bottom severely constricting the flow, hence a majority of the slurry flow is redirected upwards.

Continuing along the flow of slurry within the embodiment of FIG. 3, the floc plate assembly 90 is located between the chamber 80 and the venturi 100. In this embodiment, floc plate assembly 90 is substantially tubular and houses a multiplicity of floc plates 92. Particle collision occurs as the slurry sample flow path is directed by the floc plates 92. The collisions accelerate agglomeration of the finely divided particles induced by coagulation and flocculation. The embodiment of FIG. 3 shows floc plates 92 having a serrated surface. However, it should be appreciated that any shape which serves to agitate the slurry sample while eventually directing the flow upward will produce the desired effect. For example, in some applications substantially planar floc plates 92 work well. In another embodiment, a floc plate assembly 90 could be positioned inside the slurry sample inlet 64. In embodiments such as this, the floc plates should either be perpendicular to gravitational forces or sloped in such a way that particles are not entrapped in the inlet 64. This way the sample inlet 64 will not become clogged. In still further embodiments, the floc plate assembly 90 and the floc plates 92 may be eliminated, with the process relying on mixing that occurs elsewhere in the flow.

In the embodiment shown in FIG. 3, the bottom cap 86 and the top cap 94 serve to support and position the chamber 80, the floc plate assembly 90, and the venturi 100. The bottom cap has slots to slidably accept an upper portion of the chamber wall and a lower portion of the floc plate assembly. Likewise, the top cap has slots to slidably accept an upper portion of the floc plate assembly and a lower portion of the venturi. Both the bottom cap 86 and the top cap 94 are substantially tubular, allowing the slurry sample flow to pass through a center portion thereof, while permitting the sludge to flow through return conduit openings located between the clarifying conduit 68 and the housing chamber 62. Clearly, different assemblies could be used to hold the components of the dynamic vertical solids separator 68 together while still allowing proper flow. In one embodiment, the clarifying conduit is formed as a single piece, simply eliminating the bottom cap 86 and the top cap 94.

A low pressure region in the slurry sample flow is created as the slurry sample is discharged out of the slurry conduit 68 through the venturi 100. In one embodiment, the venturi 100 is substantially a tubular frustum with its constricting mouth forming the slurry sample outlet 66. While it is essential that the slurry sample flow discharging out of the slurry sample outlet 66 be forceful enough to promote clarification of the sample pool 104, the venturi could be shaped differently and still achieve the same result. By way of example, in one alternative embodiment, the venturi 100 may be substantially tubular and capped at the slurry sample outlet 66. In another alternative embodiment, the venturi 100 could be eliminated and a cap with a small outlet placed on top of the floc plate assembly 90.

As the slurry flow is constricted and discharged out the slurry sample outlet 66, the continuous slurry sample flow creates a dynamic sample pool 104 above the sample outlet 66 which takes on the shape of a "plume." The continuous, dynamic motion of the slurry sample discharging into the sample pool clarifies the sample pool 104. As will be appreciated by those skilled in the art, the sample pool 104 is clarified by a process which includes enhanced solids contact. Thus, a boundary 105 develops between the sample pool and a clear supernate pool 106 which rises above the sample pool. At the same time a sludge 108 settles to the outside of the sample pool 104, draining out the return conduit 70. The particles carried by the supernate will be primarily the unreacted or partially reacted, finely divided, suspended particles, while the sludge will contain the larger, reacted, agglomerated particles and the remaining silt. When the base fluid is water, the supernate 106 tends to be translucent, while the sample pool 104 remains opaque, thus creating a definite, visual boundary between the two. Often the boundary 105 will contain fluid in a partially clarified state, thereby producing a very pronounced, visible boundary.

A supernate discharge port 72 is provided at a position located above the sample pool for draining the supernate from the housing chamber 62 into a supernate discharge tube 73. In the embodiment of FIG. 3, the supernate discharge tube 73 is angled upward such that the supernate discharge port 72 faces away from the dynamic sample pool 104. Furthermore, the supernate discharge port 73 also has a lip 75 which extends from the lower portion of the discharge port 72 and is substantially perpendicular to the direction of flow of the slurry. The orientation of the discharge port 73 and the lip 75 help prevent particles with very low specific gravities, such as oil globules, bits of wood, and Styrofoam chunks, from entering the discharge tube 73. A skimming port 74 is provided above the supernate discharge port 72 to discharge these very low specific gravity particles. In alternative embodiments, the supernate discharge port 72 may be oriented in any suitable manner as for example facing horizontally and/or take the form of a port in the wall of the housing chamber 62. The upward facing discharge tube 73 tends to cause the low specific gravity globules in the vicinity of the supernate discharge port 72 to run along the lower outer wall of the supernate discharge tube 73 and along the lower portion of the lip 75 before reaching the supernate discharge port 72. When they release from the lower tip of the discharge tube, it is more likely that they will pass the supernate discharge port without becoming entrained in the supernate flow passing through the port. This is advantageous in embodiments used as filters for streaming current detectors since oils and particulant matter can foul the streaming current detector.

In the embodiment shown, the supernate 106 that enters the supernate discharge tube passes into a generally U-shaped supernate conduit 110. A supernate valve 112 may be placed at a low point in the conduit 110 to drain any remaining silt. In some embodiments this valve may be automatic. In other embodiments, this valve may be eliminated entirely. The supernate conduit 110 transports the supernate 106 to a conventional streaming current detector (SCD) 142 for measuring the concentration of finely divided particles suspended in the slurry. The supernate 106 is an ideal sample for use with the SCD 142. Having been clarified, the supernate 106 no longer contains the silt and contaminants contained in the slurry which can clog the SCD tubing and damage the SCD sensor 10. Additionally, the clarifying process quickly produces a sample representative of the steady state of the slurry. This is because all finely divided particles which would have eventually agglomerated in the steady state slurry have been dynamically filtered by the dynamic vertical solids separator 60.

In order to use the filter effectively, a pumping system must be provided. Of course, the nature of the pumping system may be varied a great deal in accordance with the needs of a particular system. Typically, a first pump would be provided to pump the slurry sample 84 into the clarifying conduit 68. A second pump would be provided to pump the supernate 106 to the SCD 142. A third pump would be provided to pump the sludge 108. Of course a wide variety of pumps may be used. By way of example, constant volume pumps such as parastolic pumps 120 work well. Preferred pumps will provide a constant, almost laminar, flow through the clarifying conduit 68. It should be appreciated that the described colloidal particle detection system can be used in a wide variety of applications and that the filter need not be used in a continuous process. If an application required that small samples of clarified slurry be taken at time spaced intervals, the system could run just long enough to provide the sample, and then shut off until a new sample was requested.

Figure 4:
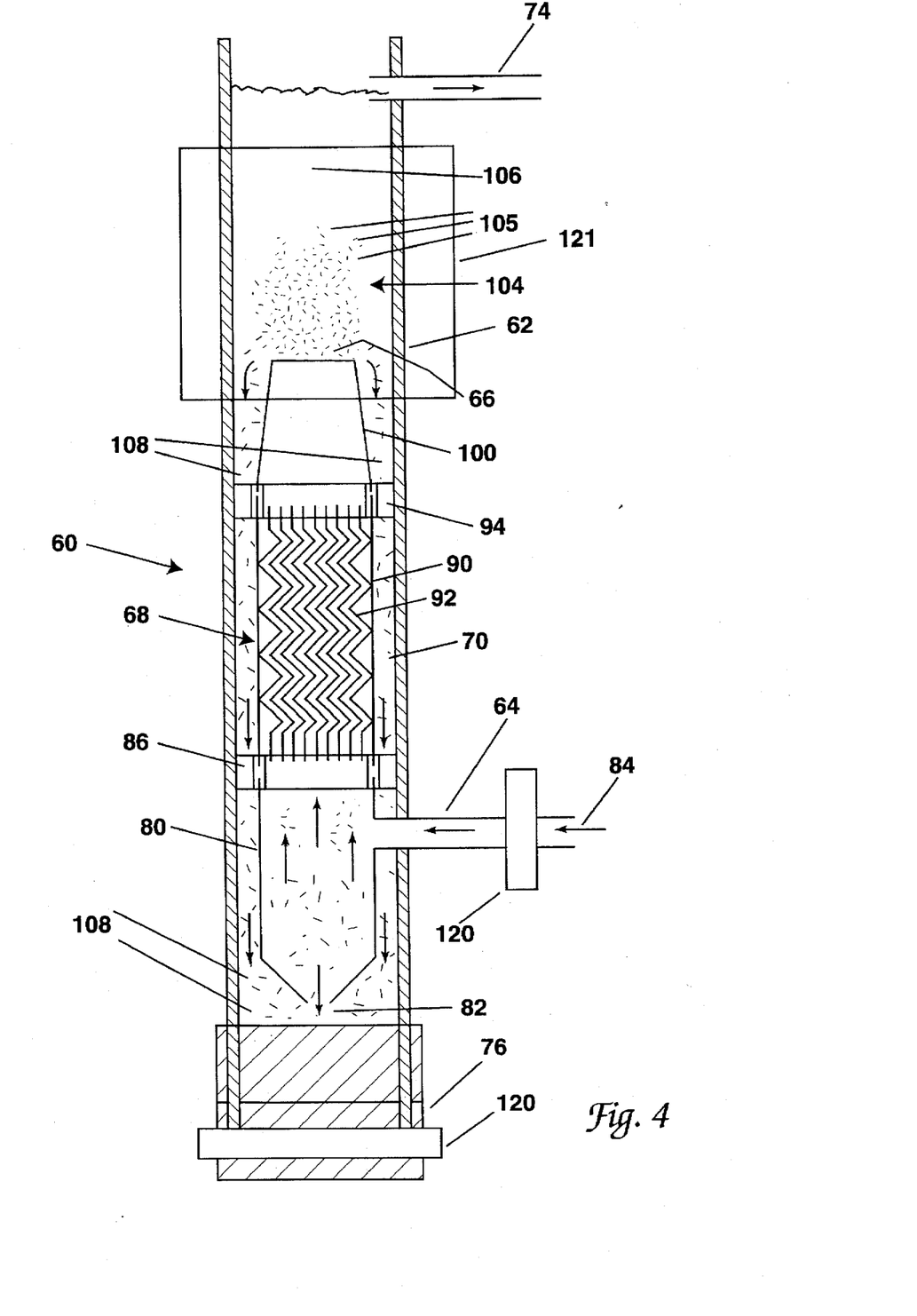
FIG. 4 is a diagrammatic illustration of a dynamic vertical solids seperator in accordance with a second embodiment of the present invention that is adapted to measure the height of the supernate/sample pool boundary.

Referring next to FIG. 4, a dynamic vertical solids separator 60 in accordance with a second embodiment of the present invention will be described. Since many of the components of the second embodiment correspond to components of the first described clarifier, like components will be labeled using like numbers. The clarifier 60 includes a housing chamber 62, a slurry sample inlet 64, a slurry sample outlet 66, a clarifying conduit 68, a return conduit 70, a supernate discharge port 72, a sludge discharge port 76 and a plume height detector 120. Like in the first described embodiment, a slurry sample 84 is pumped from its source into the clarifying conduit 68. The slurry sample 84 then flows generally upward through the clarifying conduit 68 until it is discharged into the low pressure region formed above the slurry sample outlet 66. Due to the constant flow of slurry sample 84 and the low pressure region, a clarifying slurry sample pool 104 forms above the sample outlet 66. Sludge 108 drains out of the sample pool 104 through the return conduit 70, while a clarified supernate 106 forms above the sample pool 104 and is removed by the supernate discharge port 72. In the embodiment shown, the supernate is drained away from the housing chamber 62 but is not necessarily used after it has left the clarifier 68. When the supernate 106 is not used, the supernate discharge port 72 is not necessary and the supernate and the low specific gravity particles can be discharged via the skimming port 74.

Like in the previously described embodiment, the slurry sample flow creates a dynamic sample pool 104 above the slurry sample outlet 66. The sample pool 104 takes on the shape of a plume with a boundary 105 being developed between the sample and supernate pools and the sludge 108 settling to the outside of the sample pool 104 and draining out the return conduit 70. The particles carried by the supernate 106 will be primarily the partially reacted, finely divided, suspended particles, while the sludge will contain the larger, agglomerated particles and the remaining silt. When the base fluid is water, the supernate 106 tends to be translucent, while the sample pool 104 remains opaque, thus creating a definite, visual boundary between the two. Often the boundary 105 will contain fluid in a partially clarified state, thereby producing a very pronounced, visible boundary.

It has been discovered that the position of the boundary 105 is generally related to the electrokinetic charge demand of the finely divided particles suspended in the slurry sample 84. That is, the more concentrated the finely divided particles are in the slurry, the higher the plume will extend when the sample flowrate is held steady. Thus, when the flowrates at the slurry sample inlet 64, the sludge discharge port 76, and the supernate conduit 110 are held constant, a consistent relation between the height of the boundary 105 and the concentration of finely divided particles suspended in the slurry sample 84 will exist. A plume height detector 120 is used to automatically detect the height of the plume which can thus be used for process control. It should be appreciate that net charge density measurement using this method in not as accurate as the SCD sensing method, however, since the cost of a streaming current detector is prohibitive in some applications while boundary sensors are relatively inexpensive, the boundary sensing method is often ideal. Like in the first described embodiment, constant volume pumps such as parastolic pumps may be used to control the flowrates into the clarifying conduit 68 and out of the clarifier through the various discharge ports.

Figure 5:
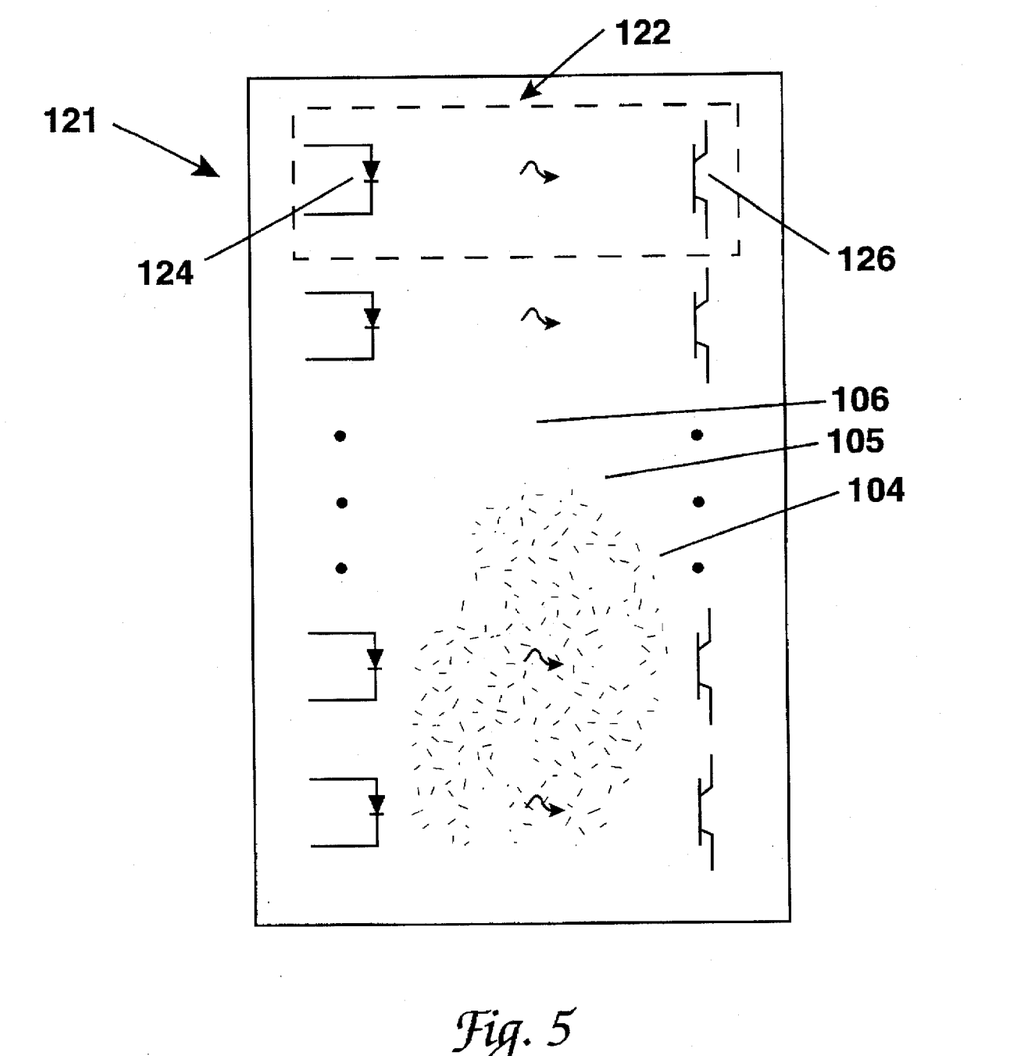
FIG. 5 is a diagrammatic illustration of the boundary sensor of the dynamic vertical solids seperator illustrated in FIG. 4.

Any suitable boundary sensor may be used as the plume height detector. By way of example, the detector used in the illustrated embodiment is an opposed mode photoelectric sensor. Other possible embodiments include a diffused mode photoelectric sensor, a retroreflective photoelectric sensor, or any of the numerous position sensors known to those skilled in the art of position sensing. FIG. 5 shows an opposed mode photoelectric embodiment of the boundary sensor 121. This embodiment includes a multiplicity of opposed mode photo sensors 122 arranged in a column, the column surrounding an upper portion of the sample pool 104 and a lower portion of the supernate. Each photo sensor 122 includes a light emitting diode (LED) 124 focused towards an opposed photo transistor 126. Simplifying the process, if a sufficient amount of light from an LED 124 reaches its corresponding photo transistor 126, the photo transistor 126 will be in a conductive state, otherwise, the photo transistor will be in a non conductive state. Because the sample pool 104 is opaque, each photo transistor 126 located below the boundary 105 will be in a non conductive state, while each photo transistor 126 located above the boundary 105 will be in a conductive state. The design of such sensors along with the design of circuitry to produce an electrical signal proportional to the position of the boundary 105 is well known to those skilled in the art of photoelectric sensor design.

Figure 6:
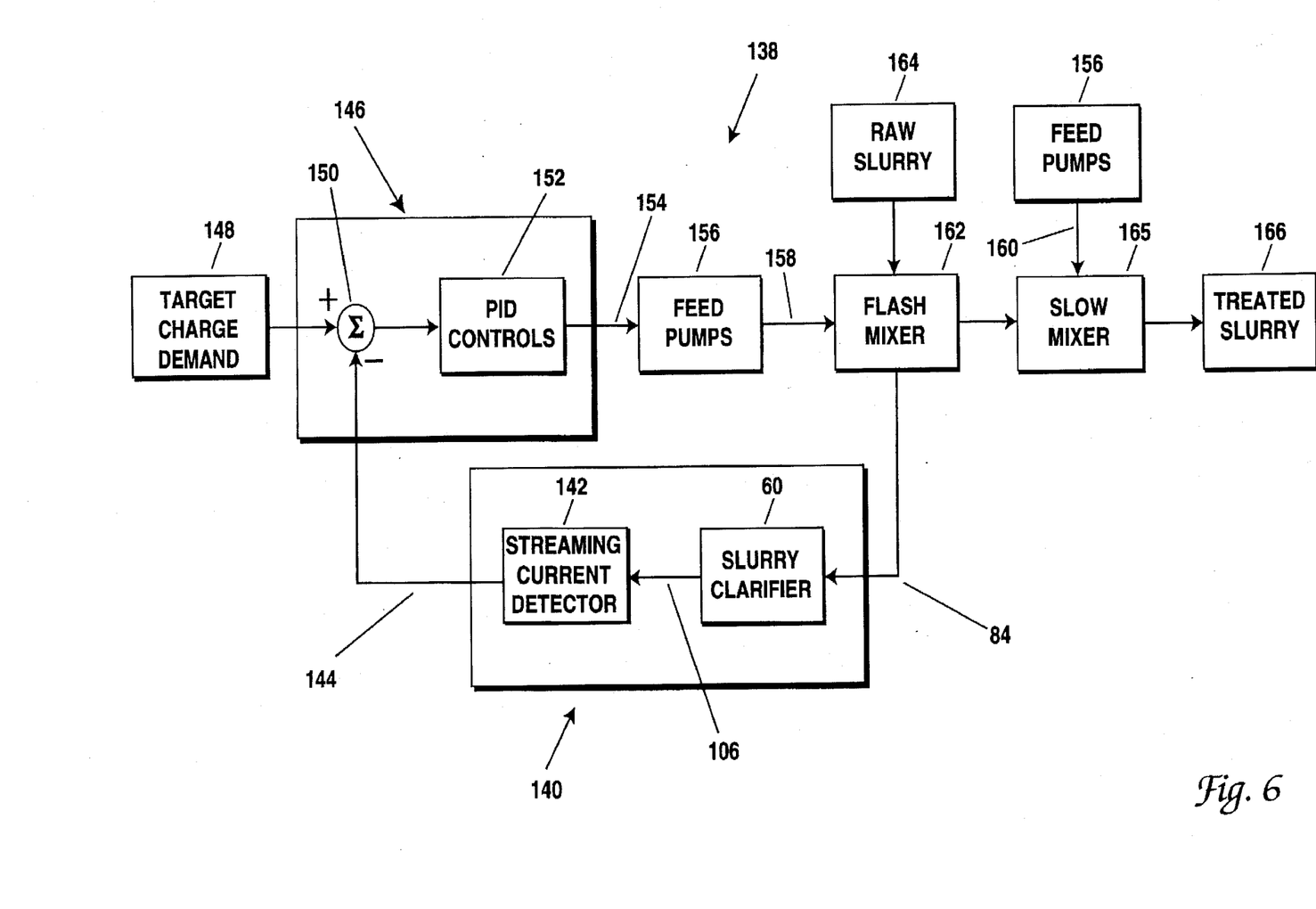
FIG. 6 is a block diagram illustrating the use of a streaming current detector incorporating the dynamic vertical solids separator of FIG. 3 to measure the net charge density of finely divided particles suspended in the slurry.
Figure 7:
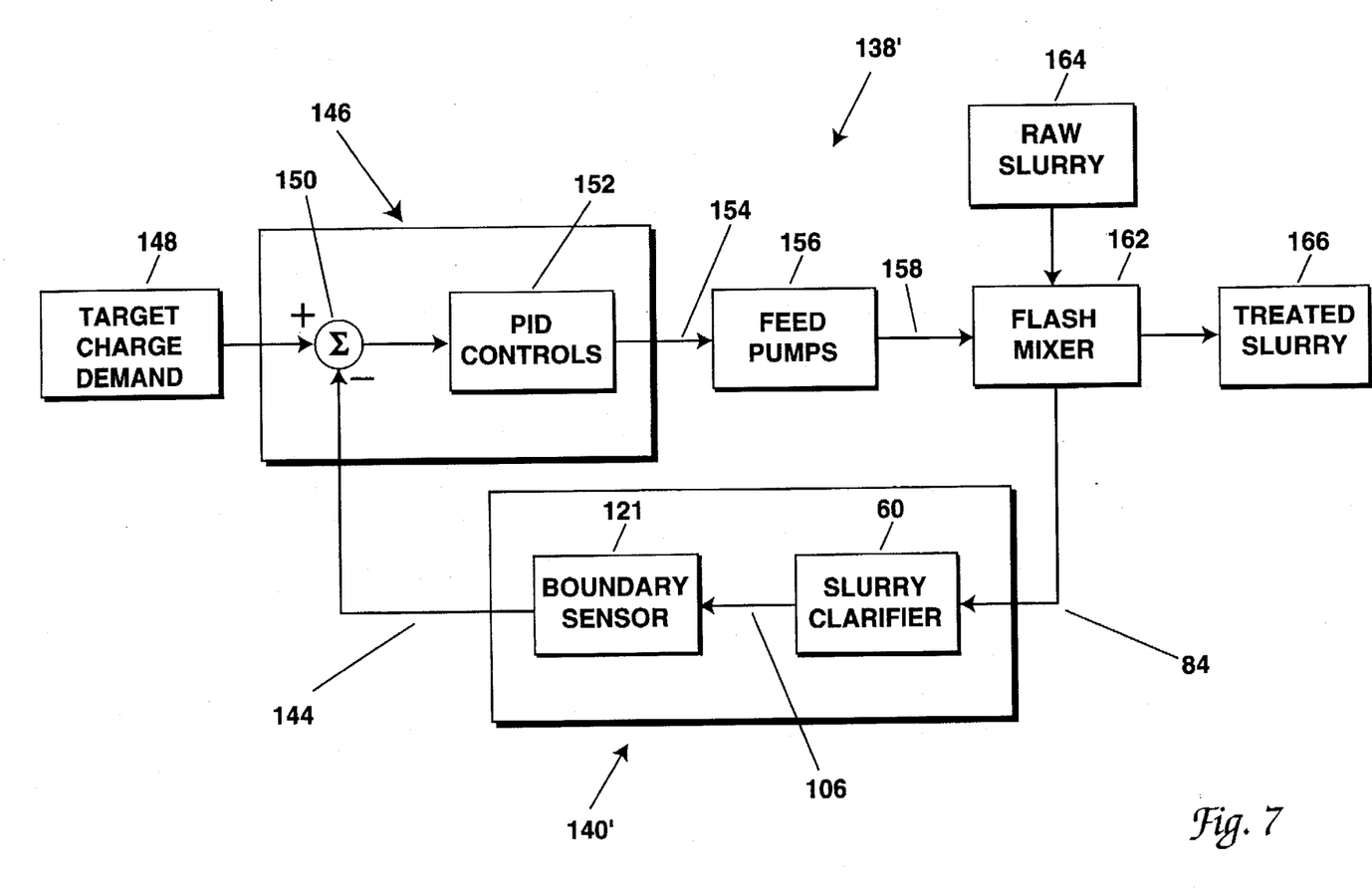
FIG. 7 is a block diagram illustrating the use of a dynamic vertical solids separator illustrated as in FIG. 4 to measure the net charge density of finely divided particles suspended in the slurry.

Referring next to FIGS. 6 and 7 the colloidal particle detectors embodied in FIGS. 3 and 4, respectively, will be described as they might be utilized in a slurry purification system such as a water treatment plant. A major component of any slurry treatment process involves the removal of turbidity particles from the slurry. As used herein, a slurry refers to any turbid solution, including an aqueous solution, some examples being raw sewage and/or waste water from any number of industrial processes including dish washing, laundries, food processing, meat packaging, corrugated box and container production, paper production, etc. Other appropriate examples include untreated water from various sources including but not limited to rivers, streams, brooks and reservoirs. Turbidity particles are not limited to but can range in size from about 0.01 to 100 microns. The larger, denser particles can be removed with relative ease, either through setting, filtration, flotation, centrifugation, or one or more of the foregoing physical separatory processes in combination. Removing the finely divided particles, which include colloidal and sub-colloidal particles, presents a more serious challenge. Generally, settling times for finely divided particles are intolerably slow, and filtration is impractical. Removal of these particles is often done by adding treatment chemicals which interact with the finely divided particles to produce larger, aggregate particles. These agglomerated particles can then be removed through one of the aforementioned separatory processes.

Referring to FIG. 6, a slurry purification system 138 in accordance with one aspect of the present invention includes a input for the target charge demand 148, a programmable controller 146, feed pumps 156, a flash mixer 162, a source of raw slurry 164 such as waste water, a slow mixer 165, and a solids particle detector 140. FIG. 6 illustrates a control loop diagram of the slurry purification system 138, which can best be described through a linear, component by component description. It should be appreciated that while this discussion may imply a step by step process, the following ordering is insignificant and many of the steps occur simultaneously as will be readily appreciated by those skilled in the art.

A slurry sample 84 is taken from a flash mixer 162 and fed into a colloidal particle detector 140. As will be appreciated by those skilled in the art, the slurry sample could be taken at other places in the treatment system such as a transfer line. The slurry sample 84 is clarified in the dynamic vertical solids separator 60 of FIG. 3. The clarified supernate 106 is then fed to a streaming current detector 142 which produces an electrical signal 144 proportional to the concentration of finely divided particles suspended in the clarified supernate 106, and therefore is generally related to the current turbidity of the slurry. The concentration signal is then provided to the programmable controller 146.

The programmable controller 146 of FIG. 6 can be a specialized control system or one of many commercially available "off the shelf" type controllers. By way of example any of the Allen-Bradley SLC-500, the Giddings & Lewis PiC900, and the Modicon 940 work well. The programmable controller 146 compares a predefined target charge demand 148 with the current charge demand 144 to provide an error command to the control algorithm 152. In this embodiment, the control algorithm used is simply a proportional, integral, derivative (PID) algorithm. Implementation of a PID algorithm, as well as any of the other numerous, suitable algorithms, is well known to those skilled in the art of control engineering.

The programmable controller 146 produces a chemical feedrate command 154 which directly controls the treatment chemical feed pumps 156. The feed pumps 156 respond by discharging the required amounts of coagulant 158 and flocculant 160 into the raw slurry. As will be appreciated by those skilled in the art, a treatment system may utilize just coagulant 158, just flocculant 160, or both chemicals, depending on the system and/or the current state of the turbid slurry. Note that in the embodiment of FIG. 6, the coagulant 158 is discharged into a flash mixer, while the flocculant 160 is discharged, at a later point in the process, into the slow mixer 165. This is standard practice as the long chemical structure of the flocullant can be destroyed by the flash mixer. The process may be arranged to operate either in a continuous manner or in batch mode.

As is illustrated in FIG. 7, the clarifier of FIG. 4 may be used in an analogous slurry purification system 138'. The slurry purification system and the controller may be arranged in the same manner as the systems described above with respect to FIG. 6. As shown in the embodiment of FIG. 7, a purifying system does not necessarily require flocullant.

In the embodiment of FIG. 7, the control signal is taken from the plume height detector as opposed to the streaming current detector.

Although only a few embodiments of the present invention have been described in detail, it should be understood that the present invention may be embodied in many other specific forms without departing from the spirit or scope of the invention. Particularly, it should be understood that the sizing, shaping, and placement of the various components may be widely varied within the scope of the present invention. For example, it should be appreciated that the chamber, the floc plate assembly, and the venturi, could be arranged to be in different stages, not necessarily all located in the clarifying conduit, or even within the housing chamber. The actual operating fluid levels and normal fluid lines as well as the geometry of each component may be widely varied to accomplish the purposes described herein.

It should also be appreciated that the slurry clarifying portion of the invention may be useful for other related purposes. For example, many different sensing devices which are used with fluid are susceptible to the same type of degradation which occur in streaming current detectors. Still further, it should be appreciated that additional steps may be taken to promote rapid agglomeration within the clarifying conduit. By way of example, an amount of flocullant proportional to the charge demand may be added to the slurry sample just prior to the slurry sample inlet. Therefore, the present examples and embodiments are to be considered as illustrative and not restrictive, and the invention is not to be limited to the details given herein, but may be modified within the scope of the appended claims.

What is claimed is:

1. A dynamic vertical solids separator comprising:
   a generally vertically oriented clarifying conduit having a slurry sample inlet and a slurry sample outlet that discharges the slurry in a generally upward direction into a sample pool, the clarifying conduit including a venturi arranged to create a low pressure region at the slurry sample outlet;
   a return conduit formed external to the clarifying conduit for draining a sludge material from the sample pool;
   a sludge discharge port arranged to drain sludge that passes through the return conduit, the discharge port being located below the slurry sample outlet; and p1 a supernate discharge port for draining supernate fluid from the sample pool, the supernate discharge port being disposed above the clarifying conduit's slurry sample outlet; and
   whereby in use, when a slurry sample is input into the clarifying conduit, the sample pool is formed over the clarifying conduit's slurry sample outlet and the slurry sample is clarified at the sample pool into a supernate and a sludge with the supernate passing substantially through the supernate discharge port and the sludge passing substantially through the sludge discharge port.

2. A dynamic vertical solids separators recited in claim 1 further comprising a skimming port positioned above the supernate discharge port for skimming materials having a low specific gravity from the supernate.

3. A dynamic vertical solids separator as recited in claim 1 wherein the clarifying conduit further includes a silt drain positioned below the slurry sample inlet for discharging especially heavy particles from the slurry sample, the silt drain being sized substantially smaller than the slurry sample outlet such that the vast majority of the slurry sample passes through the slurry sample outlet rather than the silt drain.

4. A dynamic vertical solids separator as recited in claim 3 further comprising a housing chamber that receives the clarifying conduit, the return conduit being formed between the housing chamber and the clarifying conduit and the sludge discharge port being arranged to drain the housing chamber, wherein the silt drain opens into the housing chamber below the return conduit but above the sludge discharge port.

5. A dynamic vertical solids separator as recited in claim 3 further comprising a housing chamber that receives the clarifying conduit, the return conduit being formed between the housing chamber and the clarifying conduit and the sludge discharge port being arranged to drain the housing chamber, wherein the silt drain opens outside of the housing chamber.

6. A dynamic vertical solids separator as recited in claim 1 wherein the clarifying conduit includes a multiplicity of floc plates operable for mixing the slurry sample to promote agglomeration of finely divided particles suspended in the slurry sample.

7. A dynamic vertical solids separator as recited in claim 6 wherein the multiplicity of floc plates have substantially planar surfaces.

8. A dynamic vertical solids separator as recited in claim 6 wherein the multiplicity of floc plates have substantially serrated surfaces.

9. A dynamic vertical solids separator comprising:
   a housing chamber;
   a generally vertically oriented clarifying conduit disposed within the housing chamber and having a slurry sample inlet and a slurry sample outlet that discharges the slurry in a generally upward direction within a sample pool in the housing chamber;
   a return conduit formed external to the clarifying conduit for draining a sludge material from the sample pool;
   a sludge discharge port arranged to drain sludge from the housing chamber that passed through the return conduit, the discharge port being located below the slurry sample outlet; a supernate discharge port for draining supernate fluid from the housing chamber, the supernate discharge port being disposed above the clarifying conduit's slurry sample outlet; a skimming port positioned above the supernate discharge port for skimming materials having a low specific gravity from the supernate;
   a silt drain positioned below the slurry sample inlet for discharging especially heavy particles from the slurry sample, the silt drain being sized substantially smaller than the slurry sample outlet such that the vast majority of the slurry sample passes through the slurry sample outlet rather than the silt drain.
   a venturi arranged to create a low pressure region at the slurry sample outlet;
   a multiplicity of floc plates disposed within the clarifying conduit between the slurry sample inlet and the venturi, the floc plates operable for mixing the slurry sample to promote precipitation of finely divided particles suspended in the slurry sample; and
   whereby in use, when a slurry sample is input into the clarifying conduit, a sample pool is formed over the clarifying conduit's slurry sample outlet and the slurry sample is clarified at the sample pool into a supernate and a sludge with the supernate passing substantially through the supernate discharge port and the sludge passing substantially through the sludge discharge port.

* * * * *